(12) United States Patent
Ninomiya et al.

(10) Patent No.: US 11,181,696 B2
(45) Date of Patent: Nov. 23, 2021

(54) ADAPTER ASSEMBLY HAVING A RETURN SPRING WITH A PUSH-PULL TAB

(71) Applicant: Senko Advanced Components Inc, Marlborough, MA (US)

(72) Inventors: Takuya Ninomiya, Natick, MA (US); Jeffrey Gniadek, Oxford, ME (US); Kazuyoshi Takano, Tokyo (JP)

(73) Assignee: Senko Advanced Components, Inc., Marlborough (MA)

( * ) Notice: Subject to any disclaimer, the term of this patent is extended or adjusted under 35 U.S.C. 154(b) by 0 days.

(21) Appl. No.: 16/799,290

(22) Filed: Feb. 24, 2020

(65) Prior Publication Data

US 2020/0271866 A1 Aug. 27, 2020

Related U.S. Application Data

(60) Provisional application No. 62/808,938, filed on Feb. 22, 2019.

(51) Int. Cl.
*G02B 6/38* (2006.01)

(52) U.S. Cl.
CPC ......... *G02B 6/3825* (2013.01); *G02B 6/3821* (2013.01); *G02B 6/3893* (2013.01); *G02B 6/3897* (2013.01)

(58) Field of Classification Search
None
See application file for complete search history.

(56) References Cited

U.S. PATENT DOCUMENTS

| 5,638,474 | A | * | 6/1997 | Lampert | G02B 6/3879 385/78 |
| 5,647,043 | A | * | 7/1997 | Anderson | G02B 6/3825 385/78 |
| 6,250,817 | B1 | * | 6/2001 | Lampert | G02B 6/3879 385/137 |
| 6,357,934 | B1 | * | 3/2002 | Driscoll | G02B 6/3869 385/59 |
| 6,439,918 | B1 | * | 8/2002 | Togami | G02B 6/4246 439/372 |
| 6,786,653 | B1 | | 9/2004 | Hwang et al. | |
| 6,830,385 | B2 | * | 12/2004 | Ishigami | G02B 6/3897 385/53 |
| 6,855,558 | B1 | * | 2/2005 | Hattori | H01R 13/62933 385/53 |
| 6,883,971 | B2 | * | 4/2005 | Chiu | G02B 6/3825 385/53 |
| 7,064,959 | B2 | * | 6/2006 | Kim | G02B 6/3897 361/732 |
| 7,118,281 | B2 | * | 10/2006 | Chiu | G02B 6/3893 385/53 |

(Continued)

OTHER PUBLICATIONS

International Search Report and Written Opinion for PCT Application No. PCT/US2020/019484, dated Oct. 15, 2020.

*Primary Examiner* — Tina M Wong

(57) ABSTRACT

An adapter assembly with an adapter housing and a cross-bar. The cross-bar when depressed release one or more fiber optic connectors secured with the one or more adapter ports. The cross-bar is replaced with a return spring that secures a release tab with ribs on one side of the release tab body. The number of ribs determines the number of connectors that can be released together when the user pulls on the release tab shaft.

10 Claims, 20 Drawing Sheets

(56) References Cited

U.S. PATENT DOCUMENTS

| | | | | |
|---|---|---|---|---|
| 7,351,090 B1* | 4/2008 | Moore | G02B 6/4246 |
| | | | 439/372 |
| 7,517,160 B2* | 4/2009 | Miyoshi | G02B 6/4201 |
| | | | 385/53 |
| 7,648,289 B2* | 1/2010 | Miyoshi | G02B 6/4292 |
| | | | 385/92 |
| 8,556,645 B2* | 10/2013 | Crain | H01R 13/633 |
| | | | 439/352 |
| 9,122,030 B2* | 9/2015 | Xie | G02B 6/4277 |
| 9,470,859 B2* | 10/2016 | Arekar | G02B 6/4261 |
| 9,684,130 B2* | 6/2017 | Veatch | G02B 6/3831 |
| 2003/0044129 A1* | 3/2003 | Ahrens | G02B 6/3897 |
| | | | 385/92 |
| 2004/0033027 A1* | 2/2004 | Pang | G02B 6/3825 |
| | | | 385/53 |
| 2005/0018979 A1* | 1/2005 | Mizue | G02B 6/4277 |
| | | | 385/92 |
| 2005/0141827 A1* | 6/2005 | Yamada | G02B 6/4261 |
| | | | 385/92 |
| 2008/0247762 A1* | 10/2008 | Yoshikawa | G02B 6/4292 |
| | | | 398/138 |
| 2010/0046954 A1 | 2/2010 | Liu et al. | |
| 2012/0106903 A1* | 5/2012 | Thirugnanam | G02B 6/4261 |
| | | | 385/92 |
| 2014/0050446 A1 | 2/2014 | Chang | |
| 2015/0147032 A1* | 5/2015 | Ista | G02B 6/4261 |
| | | | 385/58 |
| 2015/0378109 A1* | 12/2015 | Samal | G02B 6/3849 |
| | | | 385/58 |
| 2016/0268734 A1 | 9/2016 | Ahn | |
| 2016/0306122 A1 | 10/2016 | Tong et al. | |
| 2017/0179627 A1* | 6/2017 | Nelson | H01R 13/6471 |
| 2017/0219781 A1* | 8/2017 | Wang | G02B 6/387 |
| 2017/0276881 A1 | 9/2017 | Ott | |
| 2018/0011254 A1 | 1/2018 | Takano et al. | |
| 2018/0081129 A1* | 3/2018 | Kaga | G02B 6/3885 |
| 2018/0156988 A1* | 6/2018 | Gniadek | G02B 6/3893 |
| 2018/0217338 A1 | 8/2018 | Takano et al. | |
| 2018/0217339 A1 | 8/2018 | Hwang et al. | |
| 2018/0275357 A1* | 9/2018 | Yizhi | G02B 6/3893 |
| 2019/0154922 A1* | 5/2019 | Baas | G02B 6/3878 |
| 2020/0271866 A1* | 8/2020 | Ninomiya | G02B 6/3825 |

* cited by examiner

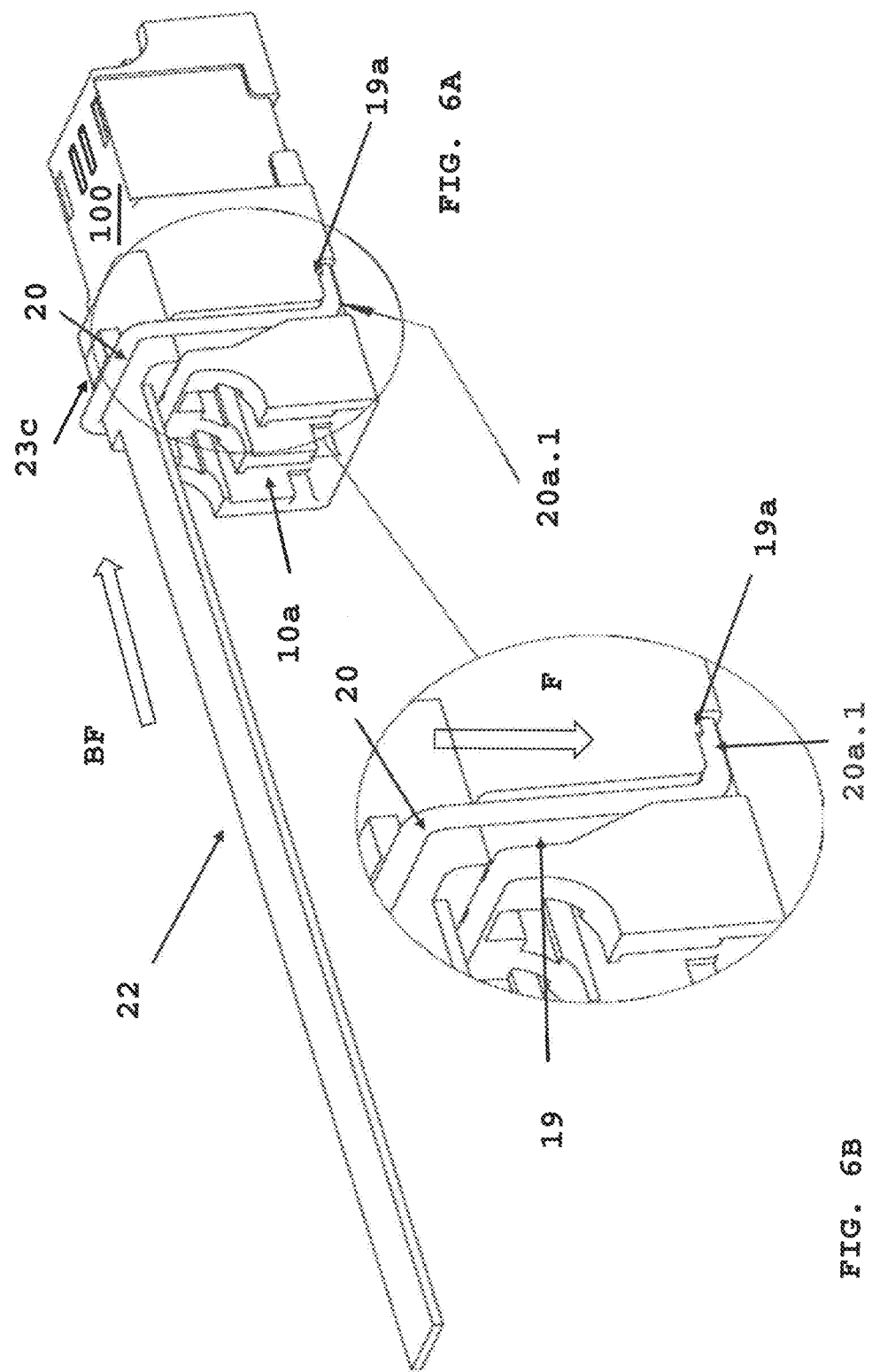

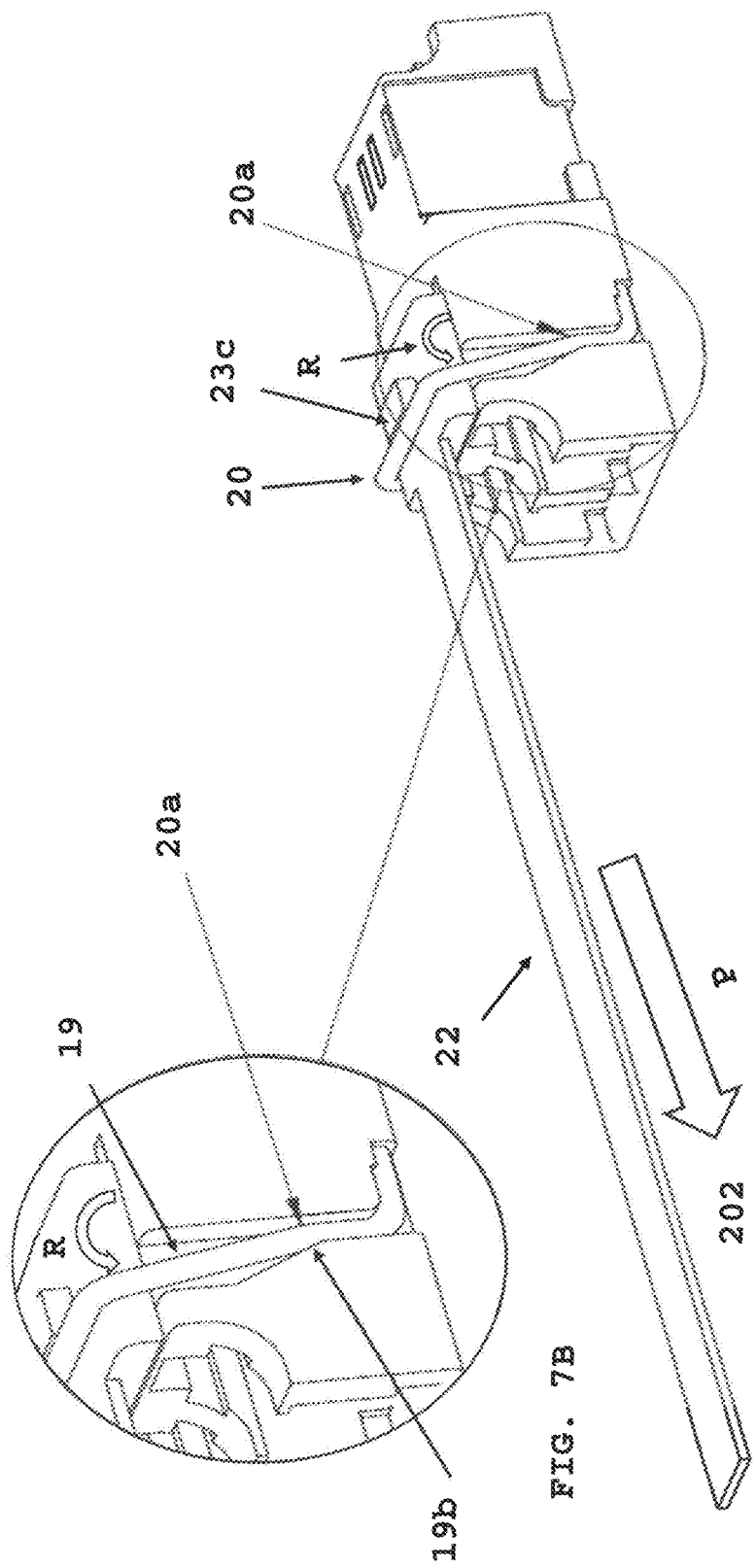

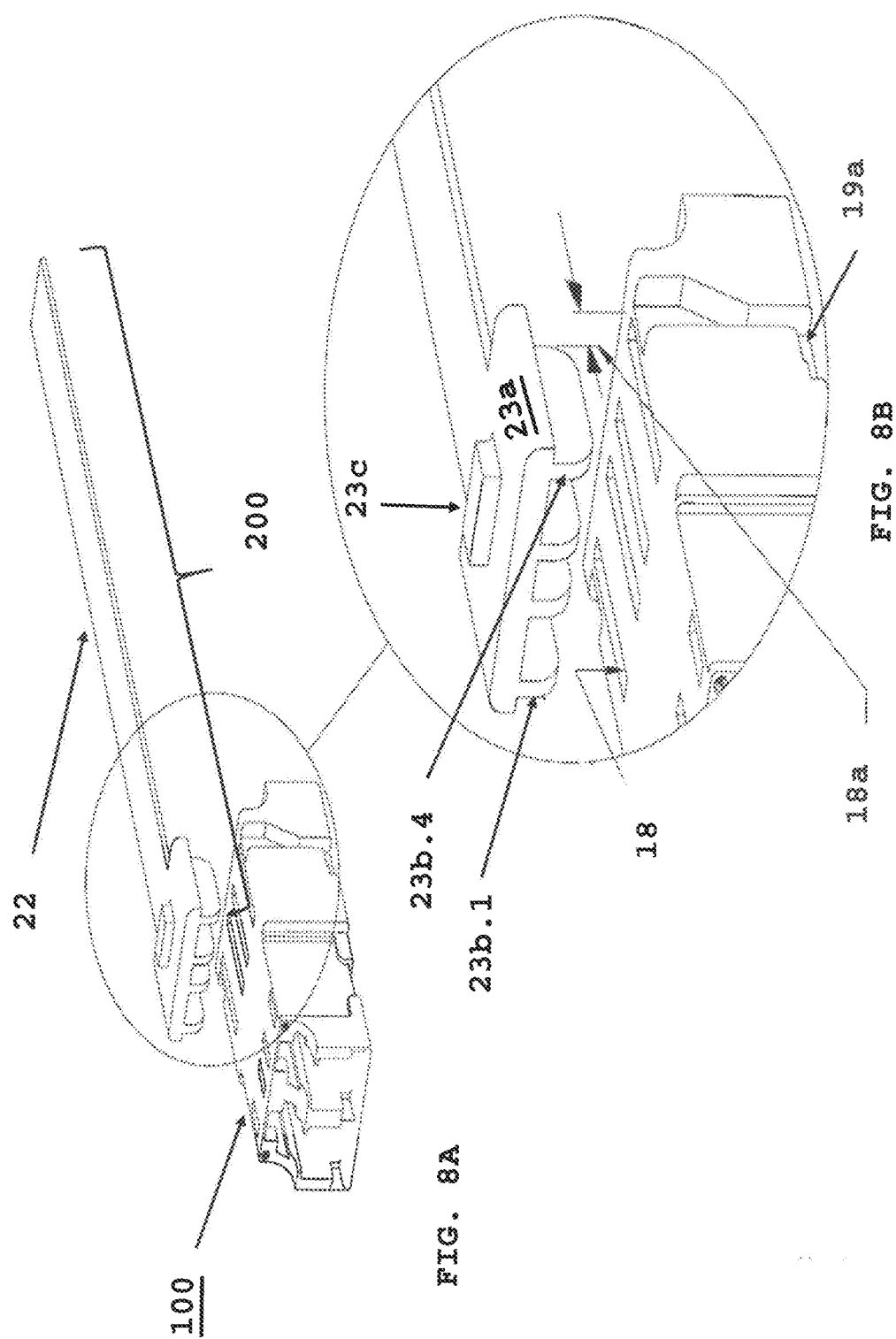

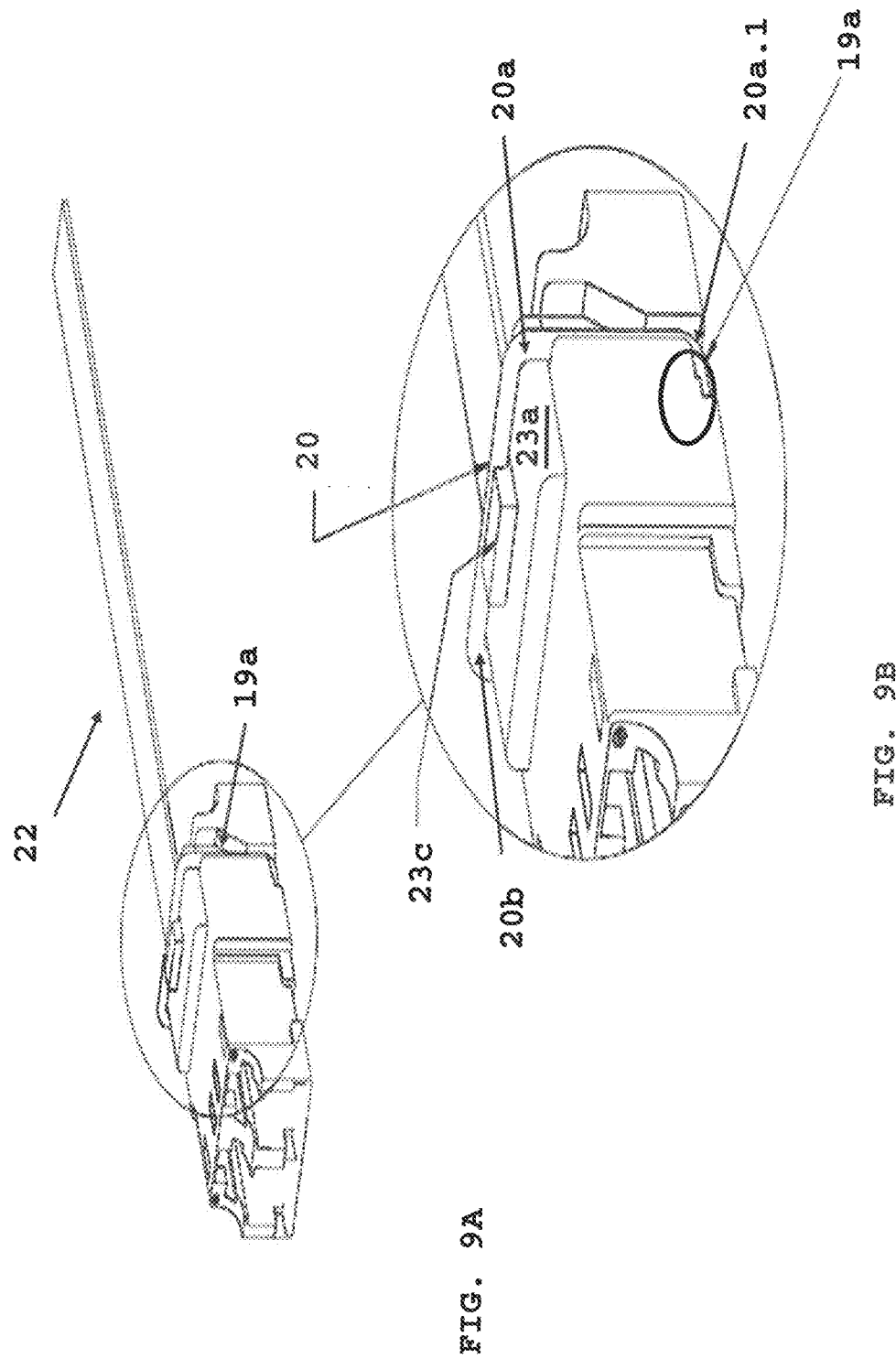

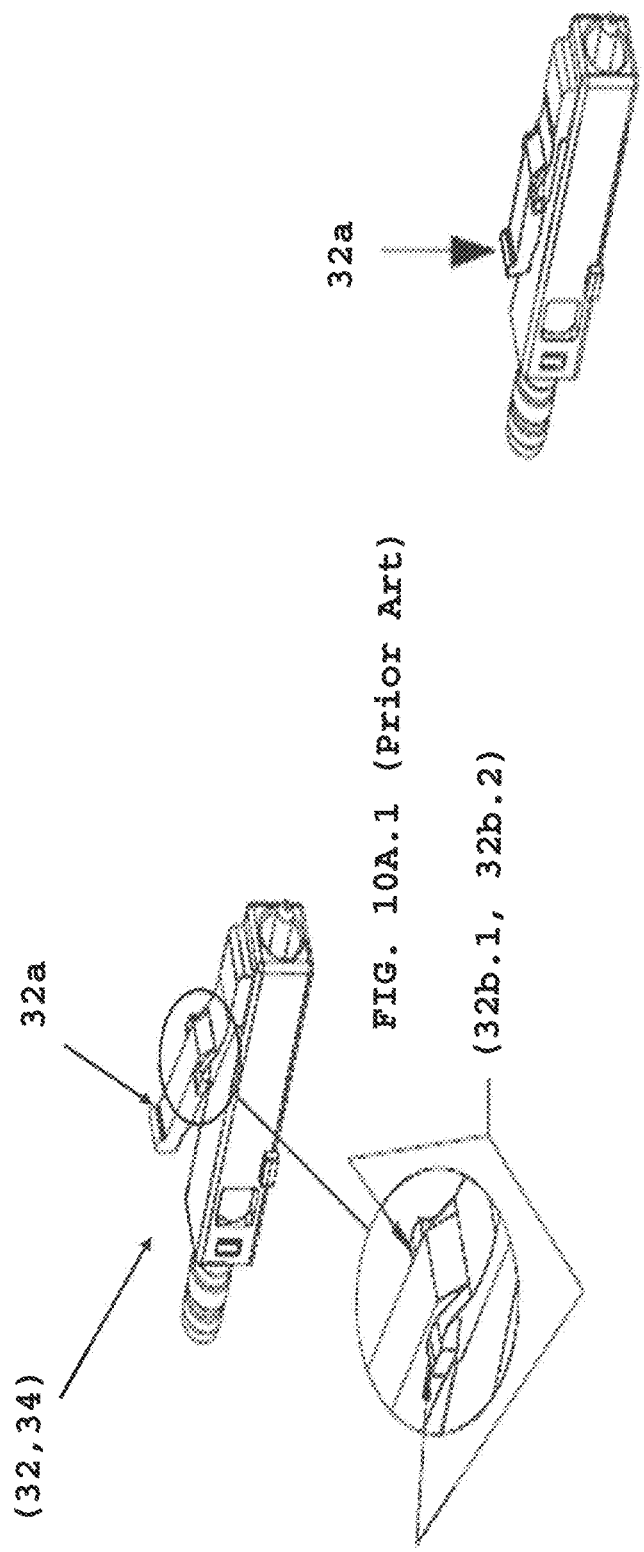

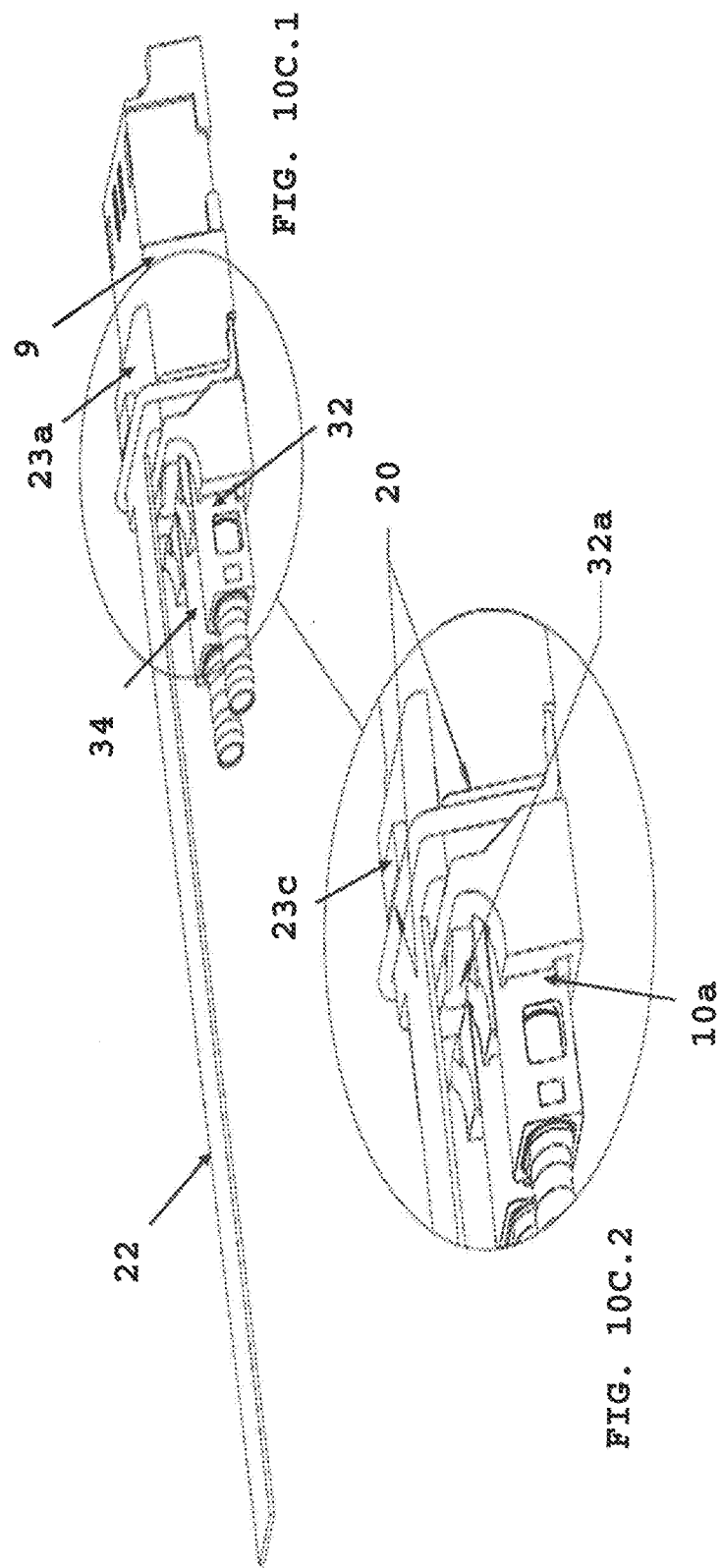

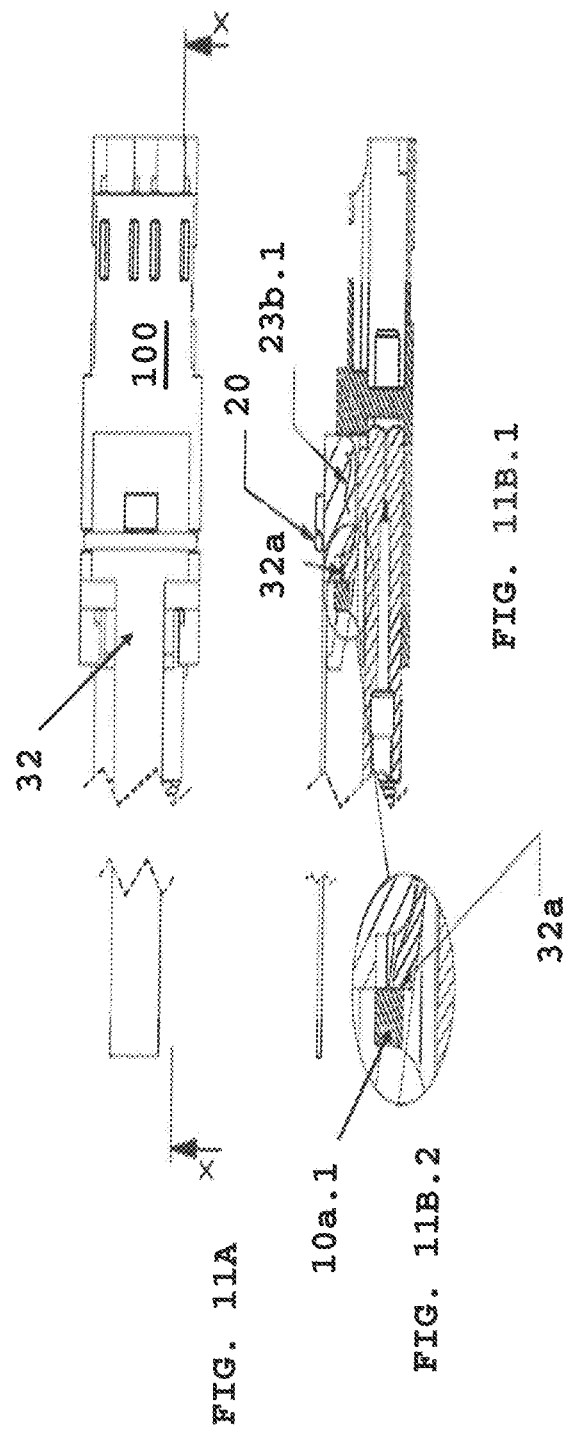

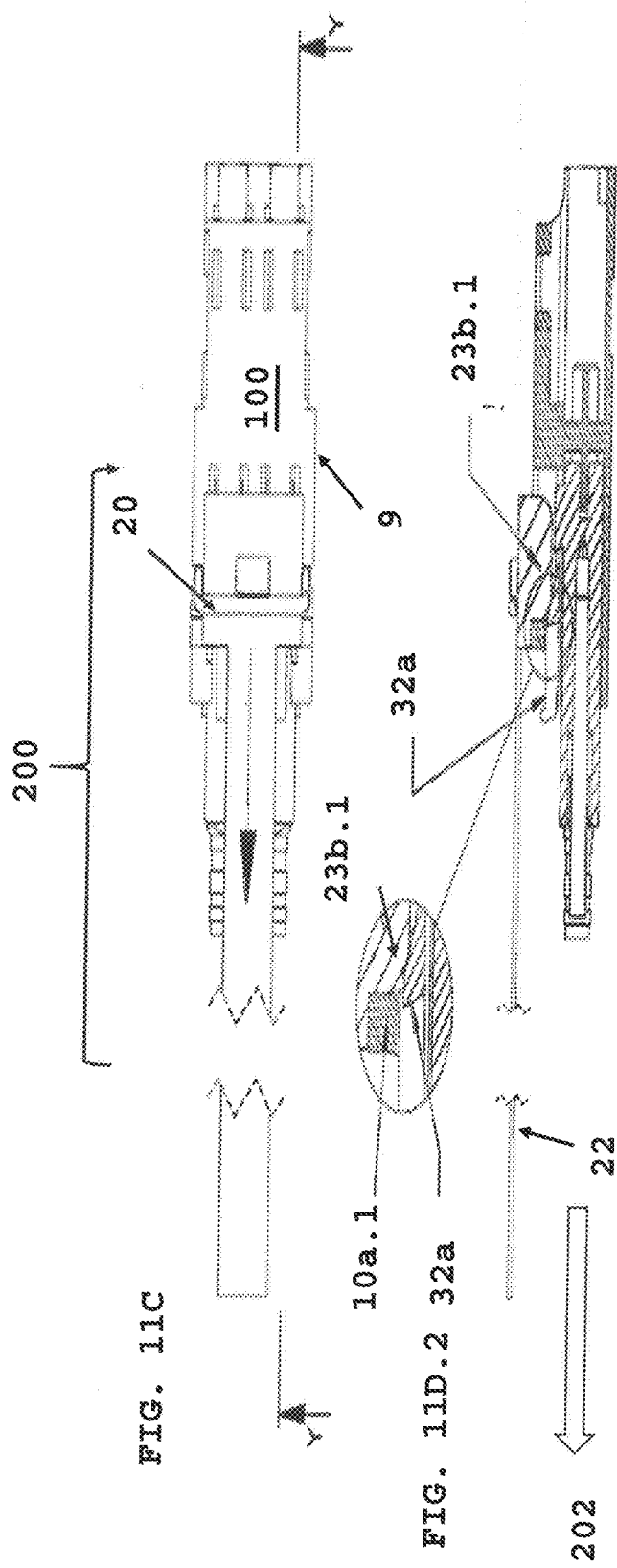

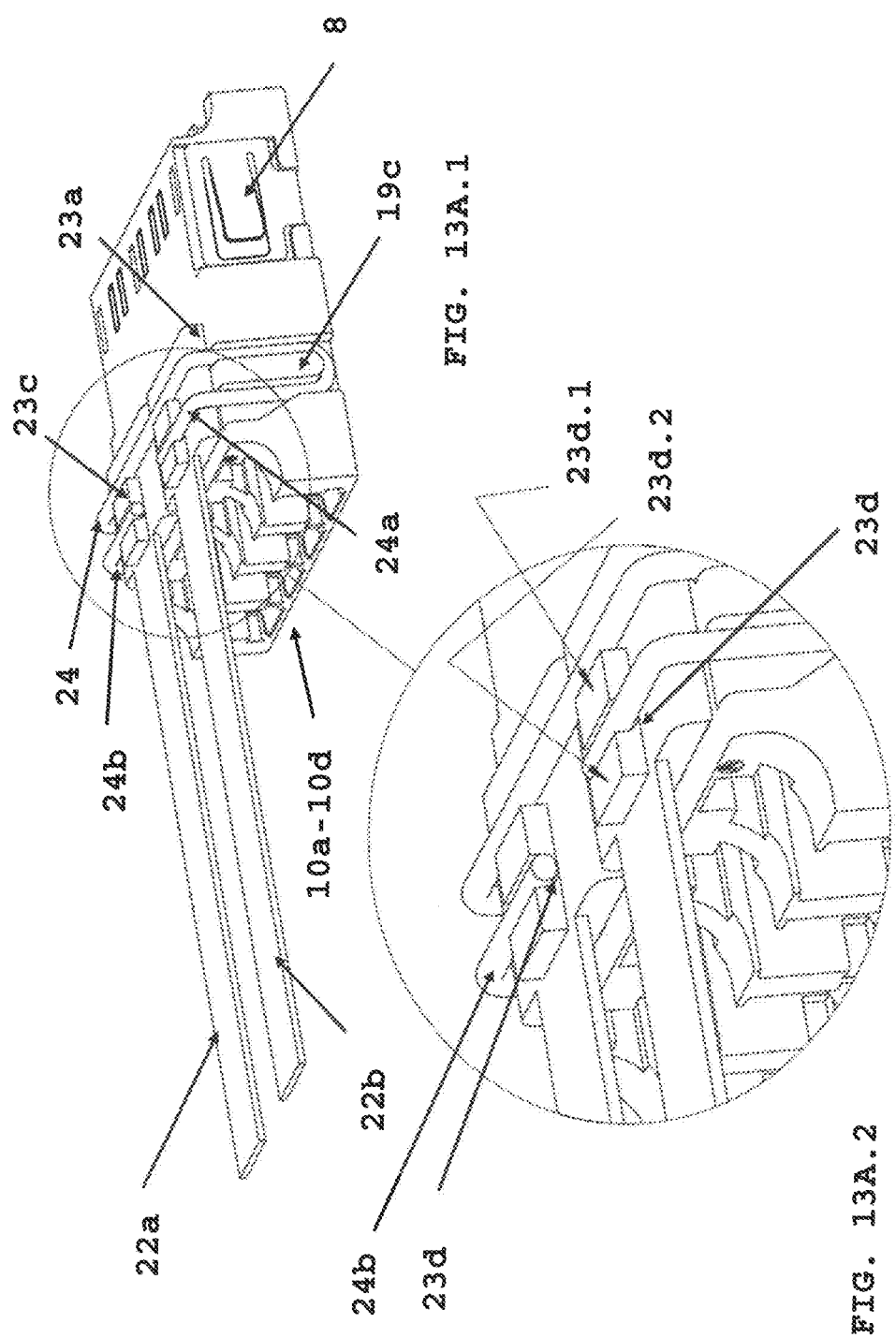

ADAPTER ASSEMBLY HAVING A RETURN SPRING WITH A PUSH-PULL TAB

RELATED APPLICATIONS

The present application claims priority from U.S. Patent Application 62/808,938 filed Feb. 22, 2019 titled "Quad Release Tool and System for Removing One or More Connectors from an Adapter", which is incorporated by reference.

BACKGROUND

The present disclosure relates generally to optical fiber connectors, and more specifically to adapter assembly having releasable attached push-pull tabs.

The prevalence of the Internet has led to unprecedented growth in communication networks. Consumer demand for service and increased competition has caused network providers need to find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. However, in a high-density panel configuration, adjacent connectors and cable assemblies may obstruct access to the individual connectors. These connectors are inserted into and retained by receptacles, which included but are not limited to adapters and transceivers. Such physical obstructions may impede the ability of an operator to insert and remove cables and the connectors from the receptacles.

SUMMARY

According to one aspect of the present disclosure, there is provided an optical fiber adapter assembly comprising a housing with one or more ports configured to secure and retain one or more fiber optic connectors. The fiber optic connectors may a mechanical transfer ferrule with a plural of optical fibers or a single ferrule with a single optical fiber. The adapter may have ports on one side opposing and in optical communication with a second of ports, or an electronic circuit commonly forming transceiver electronics. There is a longitudinal bore between the opposing ports or between the first set of ports and the transceiver electronics. The outer housing of the adapter has a flange and metal clip both assist in securing the adapter assembly to a panel. The panel is a collection or array of adapters with fiber optic connectors secured within one or more of the ports. The interconnector of fiber optic connector assemblies results in a network of optical signals. An optical signal delivers information.

The present invention improves on the standard adapter or receptacle by adding structure, such as a recess formed as part of the outer housing of the adapter. The recess is configured to accept a cross-bar that is adapted to be connected to a push/pull bar or tab, although the cross-bar can be used without the push/pull bar. The cross-bar when actuated removes, releases or otherwise disengages the fiber optic connector from the adapter port. Besides this improvement, the cross-bar is usable across many different connector types so the single optical fiber ferrule or multi-optical fiber ferrule fiber optic connector can be released with the cross-bar. The cross-bar can be used with an adapter having one port or a plural of ports.

In another embodiment, the release tab or release bar may have one or more protrusions or fins at a proximal end of the tab, and perpendicular to the tab shaft. The fins are configured to engage slots or openings found on prior art adapters. The fins disengage the fiber optic connector by depressing a release arm or retention structure at the proximal end of the connector from the adapter port retaining structure.

BRIEF DESCRIPTION OF THE DRAWINGS

FIG. 6A is an assembled, perspective view of the FIG. 5;

FIG. 6B is a zoomed view of the release spring;

FIG. 7A depicts pulling on release tab to release connectors from adapter assembly according to the present invention;

FIG. 7B is a zoomed view of operation of the return spring of FIG. 7A;

FIG. 8A depicts attaching the release pull tab with adapter assembly;

FIG. 8B depicts a zoomed view of FIG. 8A;

FIG. 9A depicts an assembled adapter assembly with pull release;

FIG. 9B is a zoomed view of FIG. 9A;

FIG. 10A.1 depicts a prior art fiber optic connector with release latch in disengaged position;

FIG. 10A.2 depicts a prior art connector lever latch features;

FIG. 10B depicts a prior art connector with latch lever release in an engaged position;

FIG. 10C.1 depicts adapter assembly with prior art connectors secured within each of the adapter ports;

FIG. 10C.2 is a zoomed view of return spring of FIG. 10C.1;

FIG. 11A is a partial side top view of the adapter assembly;

FIG. 11B.1 is a cross-section view of connector release latch secured within adapter housing;

FIG. 11B.2 is a zoomed view of connector latch in latched condition within adapter assembly;

FIG. 11C is a top view of the adapter assembly in an unlatched condition;

FIG. 11D.1 is a cross-section view of release tab releasing the connector from the adapter assembly;

FIG. 11D.2 is a zoomed view of latch being unlatched of FIG. 11D.1;

FIG. 13A.1 is a perspective view of adapter assembly deployed on a duplex adapter;

FIG. 13A.2 is a zoomed view of return spring deployed in a dual pull release of FIG. 13A.1;

DETAILED DESCRIPTION

Figure 1:
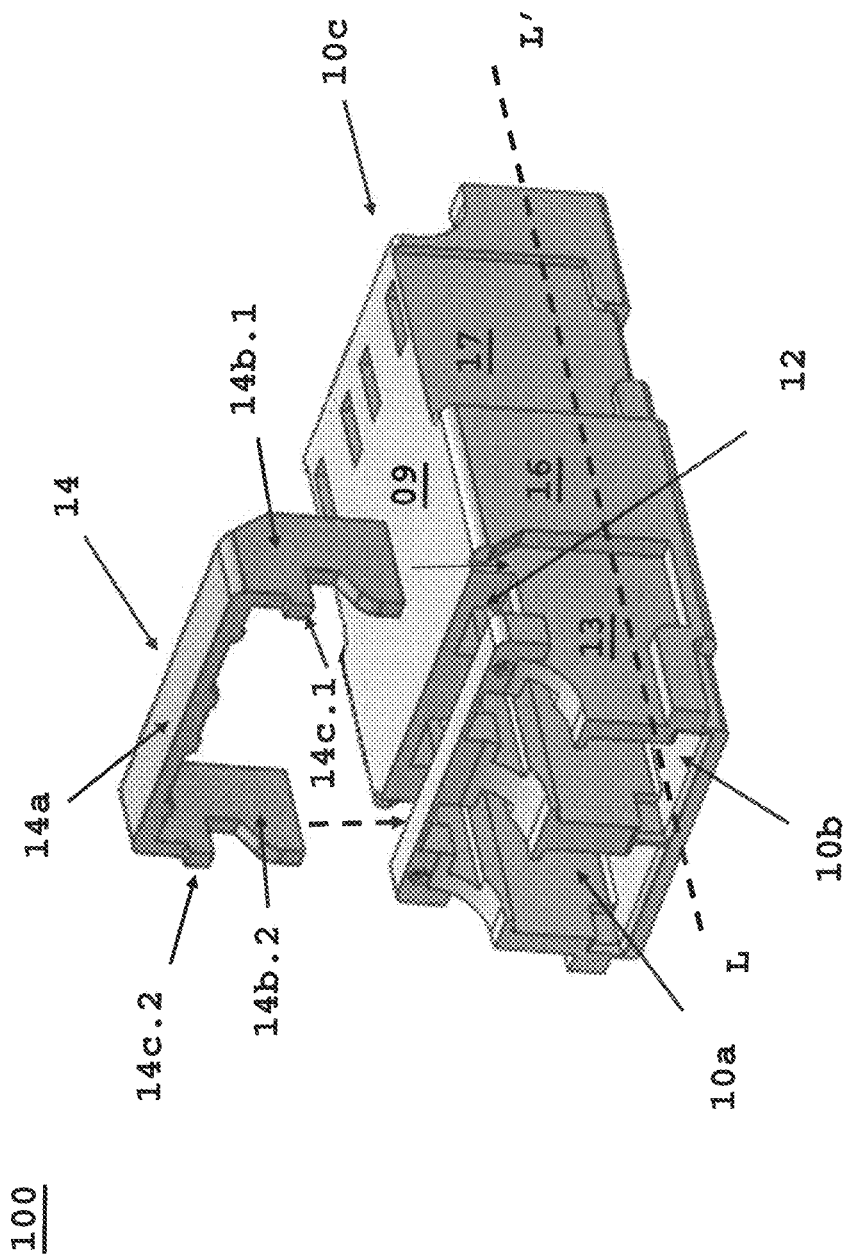
FIG. 1 is an exploded view of one embodiment of the adapter assembly.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. A fiber optic connector has at least one ferrule with at least one optical fiber. The distal end of the ferrule is spliced or fused to an incoming optical fiber from an optical cable. The ferrule is secured with a ferrule flange and biased forward with a spring on the distal side of the flange and proximal a back body. The back body has a main body with a cavity configured to hold the spring and a portion of the ferrule assembly, and on the distal end is a post that can accept a portion of the fiber optic cable such as the strength members or cable jacket. The members or jacket or both is secured to the post with a crimp ring, and the proximal end of the back body has at least two latches that secure to the connector housing. A strain relief boot is added over the post. A fiber optical connector may have a ferrule with a plural of optical fibers with similar components.

A receptacle is an adapter with internal structure to secure a proximal end or ferrule end of a connector within a port or opening. An adapter allows a first and second connector to interconnect or oppose each other to transmit a light signal from one part of a cable assembly to another, as an example. A receptacle may be a transceiver with an opening to receive a connector.

A "fiber optic cable" or an "optical cable" refers to a cable containing one or more optical fibers for conducting optical signals in beams of light. The optical fibers can be constructed from any suitable transparent material, including glass, fiberglass, polymer optical fiber, or plastic. The cable can include a jacket or sheathing material surrounding the optical fibers. Between the outer sheath and the optical fiber are strands of strength members or tensile members. In addition, the cable can be connected to a connector on one end or on both ends of the cable.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide connector assemblies having optical fiber connectors with push-pull tabs configured to allow a user to easily remove or insert connectors into adapters, such as adapters disposed on a high density panel without damaging surrounding connectors, accidentally disconnecting surrounding connectors, disrupting transmissions through surrounding connectors, and/or the like.

Figure 2:
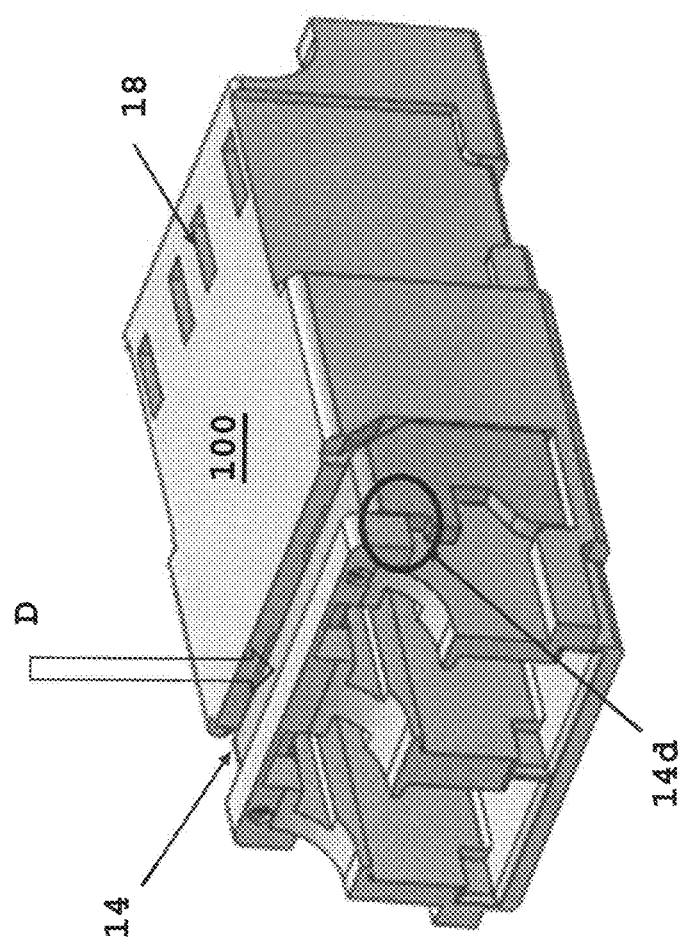
FIG. 2 is a perspective view of the adapter assembly assembled.
Figure 3:
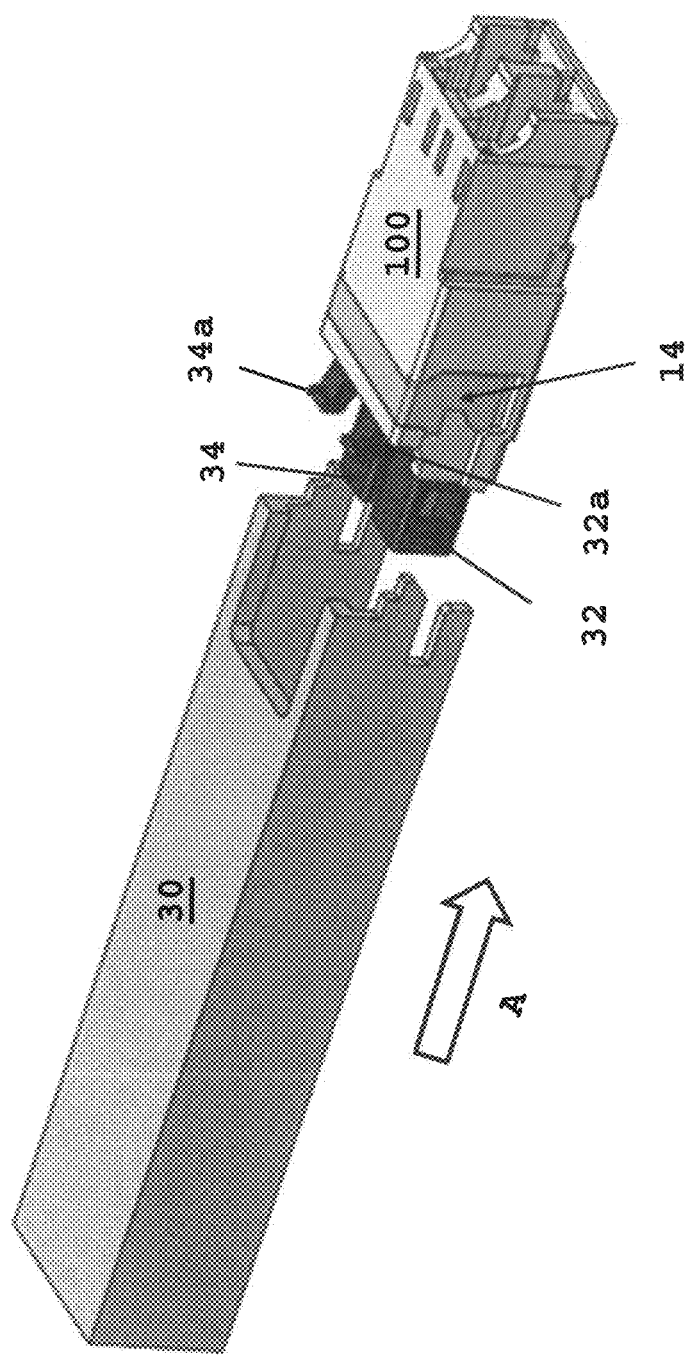
FIG. 3 is an exploded view of the adapter assembly prior to mating with a transceiver housing.

FIG. 1 depicts a first embodiment of the present invention. Adapter assembly (100) consists of adapter housing (9), one or more ports (10a-10c) configured to receive fiber optic connector (32), recess (17) configured to accept metal clip (8), and flange (16). The metal clip and flange aid in securing the adapter housing to a panel. Opposing ports (10a, 10c) forms an optical communication path along longitudinal axis (L-L'). Cut-out (13) is configured to accept and operate cross-bar (14) upon insertion and removal of the fiber optic connector within the port. Cross-bar (14) is inserted within cut-out (13) along direction of arrows within channel (12), and joining member (14a) connects legs (14b.1, 14b.2). Each leg further comprises stop (14c.1, 14c.2) respectively. Referring to FIG. 2, cross-bar (14) drops within side recess or cut-out (13) under the force of gravity forming gap (14d). Plural of slots (18) receive a portion of latch (32a, 34a) to secure the fiber optic connector in the adapter port, which is known in the prior art. When fiber optic connector (32, 34) is inserted into port (10a, 10b, or 10c), cross-bar (14) is lifted by connector latch (32a, 34a) until joining member (14a) is substantially flush with adapter housing (9) or gap (14d) is closed by the cross-bar leg (14b.1, 14b.2), as depicted in FIG. 3. Still referring to FIG. 2, cross-bar (14) is raised to close gap (14d) when a fiber optic connector inserted into at least one adapter port. Step 1 is securing cross-bar (14) joining member (14a) within channel (12) and recess (13). The joining member snaps into the channel, and the recess allows the cross-bar to float within the recess without falling off the adapter housing. This free-floating cross-bar is accomplished, in part, by gap (14d) as depicted in FIG. 2. The vertical movement of the cross-bar (14) is maintained by the gap distance, such that, depressing the cross-bar as shown by arrow "D", of FIG. 2, fiber optic connector latches (32a, 34a) or another adapter latch, known in the prior art, is depressed thereby releasing the fiber optic connectors from within the adapter ports receiving structure.

Figure 4:
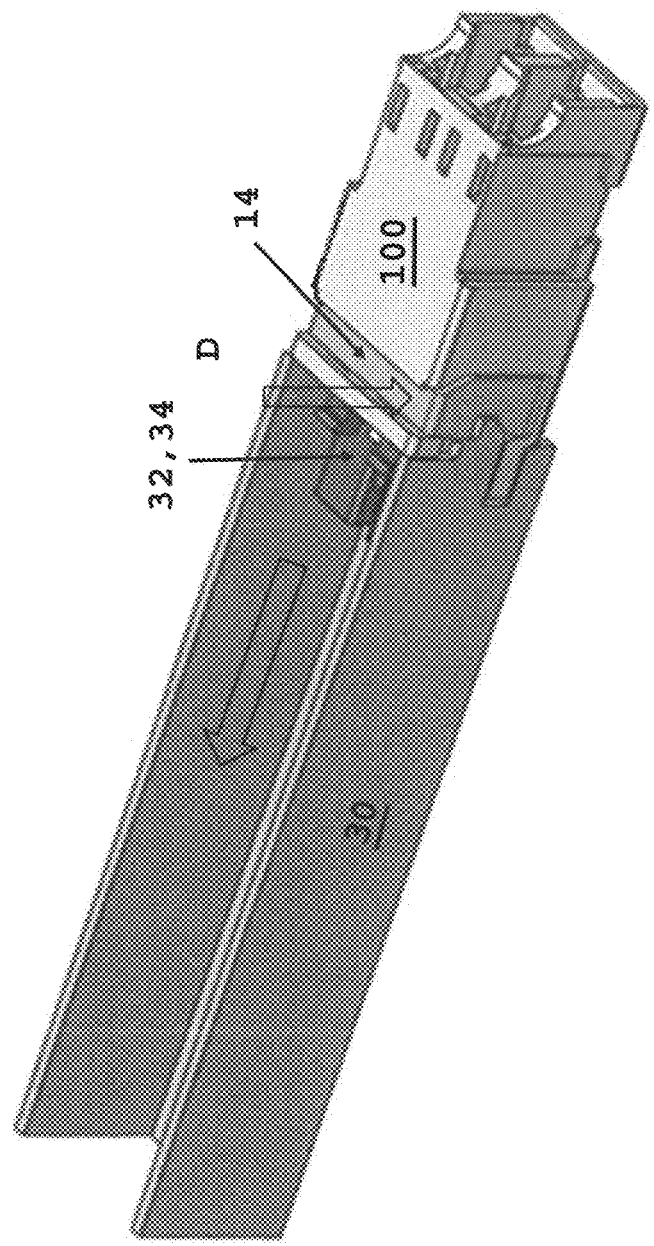
FIG. 4 is a perspective view of FIG. 3 assembled.

FIG. 3 depicts adapter assembly (100) installed with fiber optic connectors (32, 34) with cross-bar (14) flush with the top of the adapter housing. Tool (30) is inserted to fit with cross-bar (14) capturing stop (14c.1, 14c.2). Upon fully insertion of tool (30) its pulls down cross-bar (14) thereby releasing the fiber optic connectors from their respective adapter ports, as depicted in FIG. 4. FIG. 4 further depicts to remove the adapter assembly, the user would depress cross-bar (14) as shown or fully insert tool (30), and this would release the fiber optic connectors (32, 34) from their respective adapter ports. In operation, cross-bar (14)

depresses latches (32a, 34a), by moving down in direction of arrow "D", which allows the user to remove the fiber optic connectors from their respective adapter ports in the direction of the arrow as shown. At Step 2, inserting one or more fiber optic connectors (32, 34) will lift or float up the cross-bar (14) to be flush with the adapter outer housing, as depicted in FIG. 3. FIG. 4 depicts Step 3, a user can depress the cross-bar (14) or use tool (30) to release the connectors from the adapter.

Figure 5:
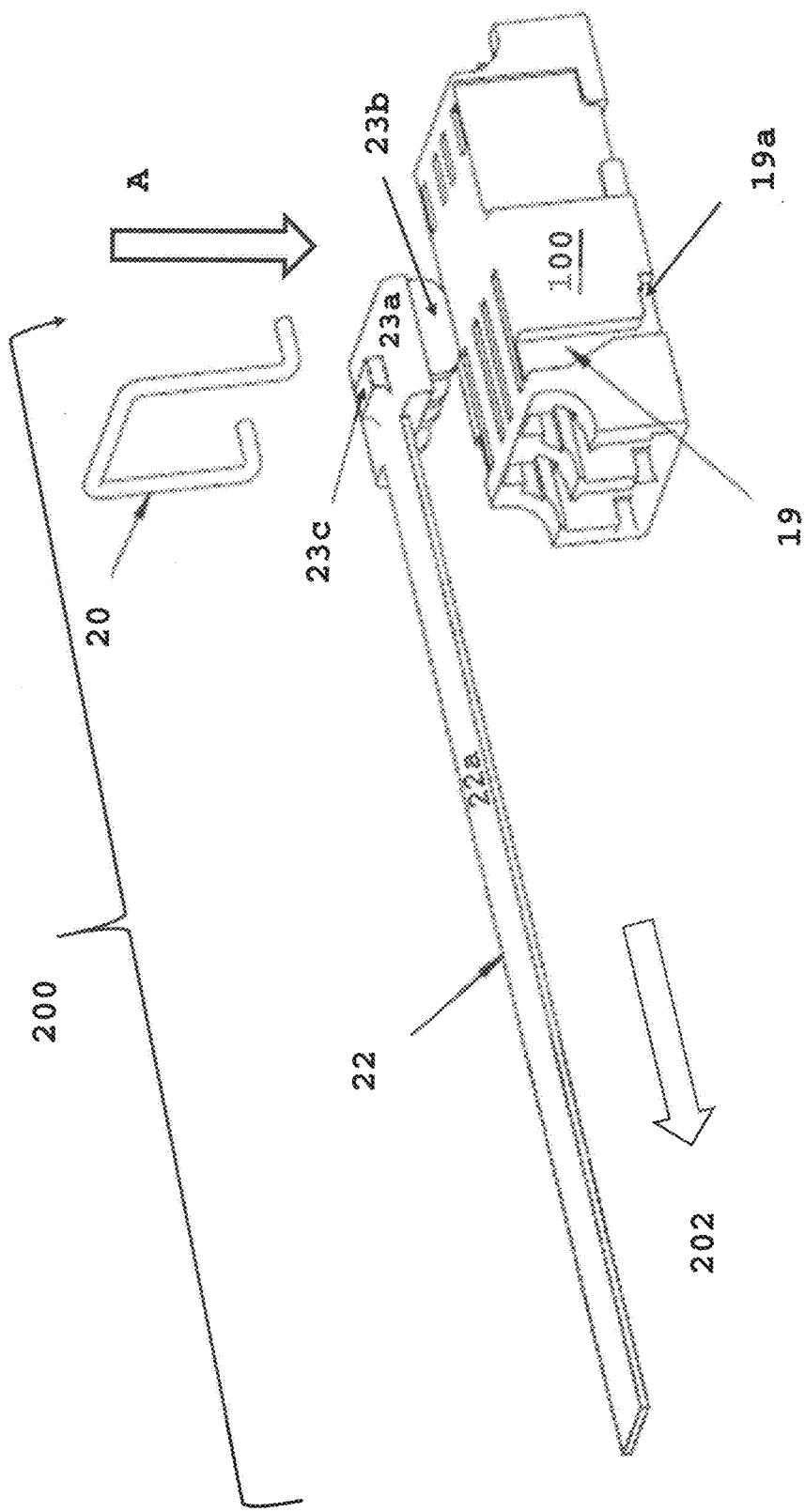
FIG. 5 is an exploded view of another embodiment of the present invention deploying a release tab return spring.

FIG. 5 depicts a second embodiment of the present invention. Adapter assembly (100) cut-out or side recess (19) is configured to retain and operate return spring (20). Return spring (20) holds pull release tab (22) when assembled over tab body (23a) and within side recess (19) as depicted in FIG. 6. The tab further comprises shaft or release tab (22a) that a user can pull on to release one or more fiber optic connectors from their respective adapter port. The tab further comprises body (23a) with one or more rib (23b). Each tab (23b.1-23b.4), in FIG. 5, depresses fiber optic connector latch (32a, 34a), which in turn releases the fiber optic connector from the adapter port when the tab (22) is pulled in distally (202). As depicted in FIG. 5, release assembly (200) comprises shaft (22a) forming pull tab (22), return spring (20), body (23a), one or more rib (23b), and locking or retention protrusion (23c) for return spring (20). Adapter outer housing (9) has side recess (19), (with cut out (19a) to accept a bend of the return spring at distal end of the arm), on opposing sides of the adapter housing to accept return spring (20).

FIG. 6A depicts pull release tab (22) secured about adapter housing (9) by distal end of the return spring within cut-out (19a). Protrusion (23c) maintains tension on return spring (20) when secured within cut-out (19a), and further tensioned by the return spring bend (20a.1) captured within cut-out (19a) formed at the base of side recess (19). FIG. 6B is a zoomed view of return spring (20) tensioned within side recess (19) more specifically opposing arm (20a, 20b) are tensioned within opposing cut-outs (19a) formed within adapter housing (9). Return spring (20) maintains a downward force "F" imparted to ribs (23b) where each rib (23b.1, 23b.2, 23b.3, 23b.4) (refer to FIG. 8B) pushes down latch (32a, 34a) of the respective fiber optic connector. Release tab (22) is biased in a forward direction "BF" by return spring (20), thereby, requiring a user to pull release assembly (200) in a distal direction to release a fiber optic connector from its adapter port. For example, when release tab (22a) is pull distal, rib (23b) depress latch (32a) which releases fiber optic connector (32) from adapter port (10a).

FIG. 7A and FIG. 7B depicts operation of return spring (20) when the user pulls on release tab (22) in direction of arrow "P", or distal direction (202). Return spring (20) rotates in direction of arrow "R", when the pull force "P" is captured and transmitted via protrusion (23c) into return spring (20). Ribs (23b) depress latch (32a) and upon further distal movement of the release tab, the rib moves the connector out of the adapter port, or the user can grab the connector fiber optic cable at the distal of the connector housing to complete the removal of the connector from the adapter port. Side recess (19) further comprises raised surface (19b) that engages the return spring, and the surface acts as a focal point to allow the spring to rotate under the force "P", as shown in FIG. 7B.

FIG. 8A and FIG. 8B depict release assembly (200) with four rib (23b.1-23b.4) configured to remove the fiber optic connectors being used with quad adapter (100) ports. FIG. 8B is a zoomed view of body (23a) with protrusion (23c) and plural of rib (23b.1-23b.4). Ribs (23b.1-23b.4) are received in corresponding slot (18). Each slot (18) is configured to be slight longer (18a) than the length of the rib to allow from distal (202) movement to release the fiber optic connector inserted in the adapter port.

FIG. 9A and FIG. 9B depict return spring (20) securing and biasing release tab (22) to outer housing of adapter (9), with return spring (20) arm (20a) within cut out (19a) formed at base of each opposing side recess (19). Opposing arm (20b) is secured in opposing side recess (19) not shown on opposite side of adapter outer housing (9). At a distal end of arm (20a) is bend (20a.1) that is secured within side recess cut out (19a), thereby securing the return spring about body (23a).

FIG. 10A.1, FIG. 10A.2 and FIG. 10B depict a prior art fiber optic connector (32, 34) used in the present invention. Other connectors such as mechanical transfer ferrule connectors can be deployed within an adapter using release assembly (200). FIG. 10A.1 depicts latch (32a) in a released or open position. Each latch is biased in this configuration to secure the connector with corresponding adapter structure as found in the prior art. FIG. 10A.2 depicts latch surface (32b.1, 32b.2) that are secured with corresponding inner adapter port structure when the latch is in is position shown in FIG. 10A.1. FIG. 10B depicts latch (32a) depressed to remove the connector from an adapter port (not shown) by the rib formed as part of the body of the release assembly.

FIG. 10C.1 and FIG. 10C.2 depict fiber optic connectors (32, 34) inserted into corresponding adapter ports (10a, 10b) and return spring (20) (refer to FIG. 10C.2) biases forward release arm (22), and retains body (23a) with adapter outer housing (9). As shown in FIG. 10C.2, latch (32a) is biased open securing fiber optic connector (32) within adapter port (10a).

FIG. 11A depicts top view of connector (32) inserted into the adapter port of assembly (100) deploying return spring (20) instead of cross-bar (14). FIG. 11B.1 is a cross-section along section line X-X FIG. 11A. Latch (32a) is shown in an up position or biased up position as depicted in FIG. 10A.1, which means the connector is secured within the adapter port. Return spring (20) is secured within a recess or slot formed in protrusion (23c). Rib (23b.1) is proximal of latch (32a) as return spring (20) biases forward body (32a) and rib (23b.1) attached to the body. FIG. 11B.2 depicts zoomed view of latch (32a) secured behind adapter port (10a) inner surface (10a.1). When latch (32a) is depressed by the distal movement of rib (23b.1), latch (32a) is depressed as shown in FIG. 10B, and the connector can be removed from the adapter port.

FIG. 11C depicts quad release assembly (200) (refer to FIG. 8A) secured to adapter housing (9) by return spring (20). FIG. 11D.1 is a cross-section along line Y-Y of FIG. 11C. Rib (23b.1) starts to engage latch (32a) as shown in zoomed view of FIG. 11D.2, as user pulls release tab distally (202) in direction of arrow. FIG. 11D.2 is a zoomed view of rib (23b.1) fully depressing latch (32a) beneath inner adapter retaining structure (10a.1).

Figure 12:
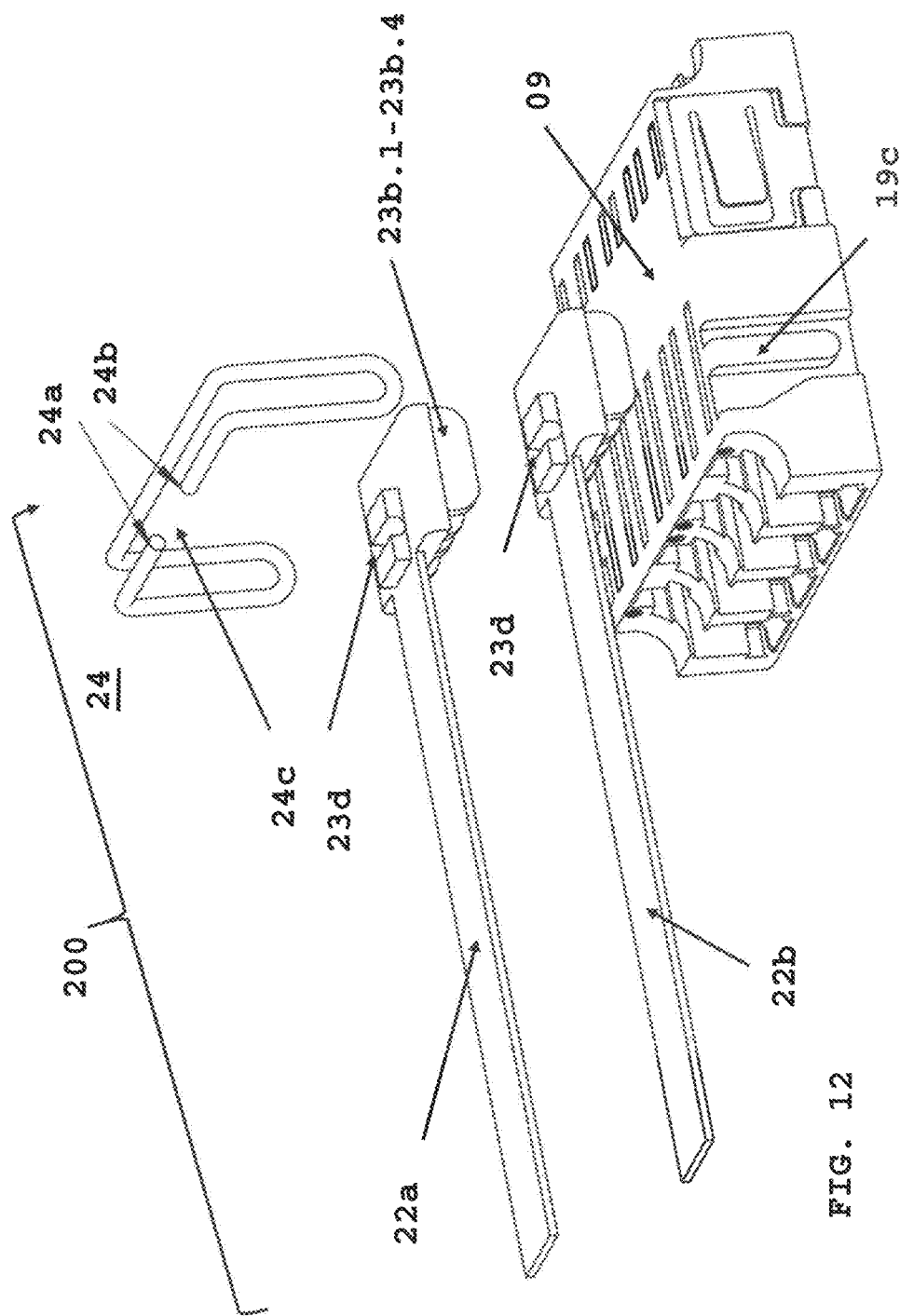
FIG. 12 is an exploded view of the adapter assembly deployed with a quad adapter housing.

FIG. 12 depicts a third embodiment of release assembly (200), which deploys return spring (24) configured to operate release tab (22a, 22b) independently of each other. This is accomplished by gap (24c) formed between arms (24a, 24b). Each body (23a) protrusion (23c) is recessed (23d) to accept arm (24a, 24b) respectively. Pulling on the release tab in a distal direction distorts arm (24a, 24b) depending on the release tab pulled distally. Thus each arm (24a, 24b) can be rotated independently as shown in FIG. 14C in direction of "R". Each arm (24a, 24b) operates the same as return spring (20) in recess (19) as described in FIG. 7A and FIG. 7B. FIG.

12 depicts retention surface (19c) that secures the bend in arm (24a, 24b) respectively so the arm may rotate (FIG. 24C) when shaft (22a, 22b) is pulled distally.

FIG. 13A.2 depicts zoomed view of FIG. 13A.1. FIG. 13A.1 depicts metal clip (8) that can hold the adapter within an opening formed in a panel. A plural of adapter ports (10a-10b) can each accept a fiber optic connector. Return spring (24) is shown installed about the adapter housing with arms (24a, 24b) secured within recess (23d) to independently release a fiber optic connector from an adapter port. Arm (24a) causes release of a fiber optic connector form adapter ports (10c, 10d), and arm (24b) releases a connector from ports (10a, 10b). FIG. 13A.2 depicts arms (24a, 24b) retained in respective recesses (23d) formed in protrusion (23c). Protrusion (23c) is cut with a slot or recess (23d) bifurcating the protrusion into front section (23d.1) and rear section (23d.2).

Figure 14A:
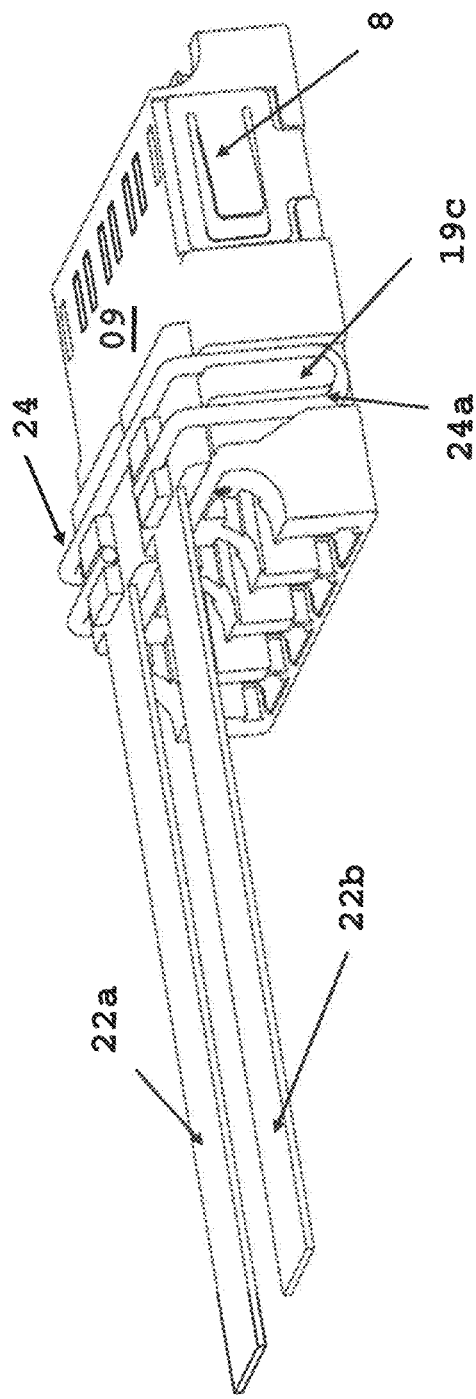
FIG. 14A is a perspective view of two release tabs secured to a duplex adapter.
Figure 14B:
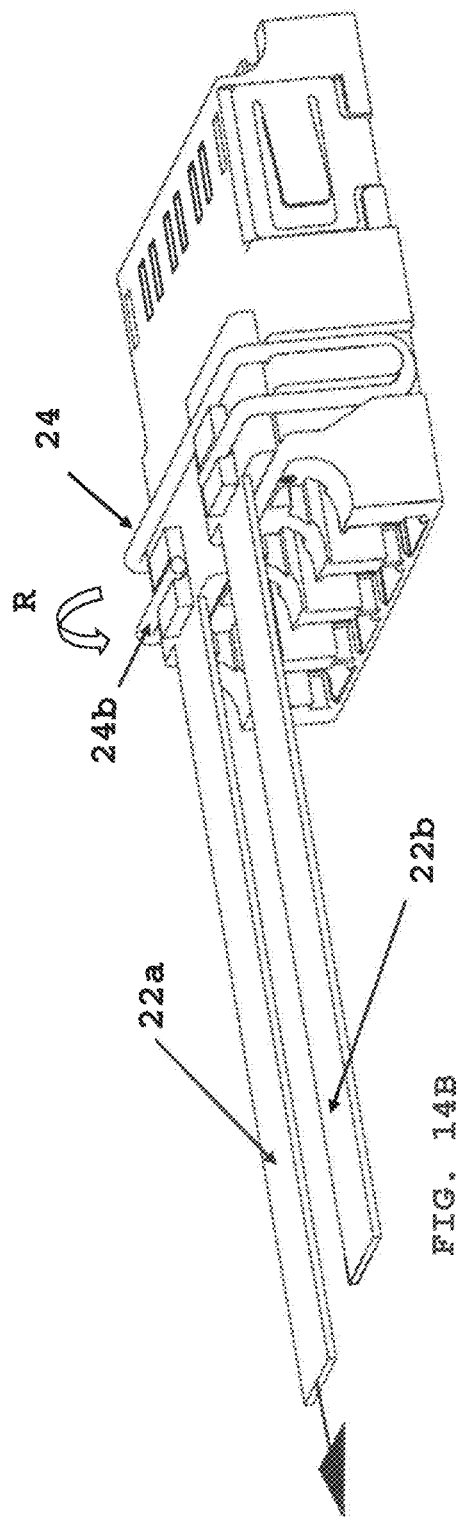
FIG. 14B depicts pulling back one release tab of FIG. 14A independently of the second release tab.
Figure 14C:
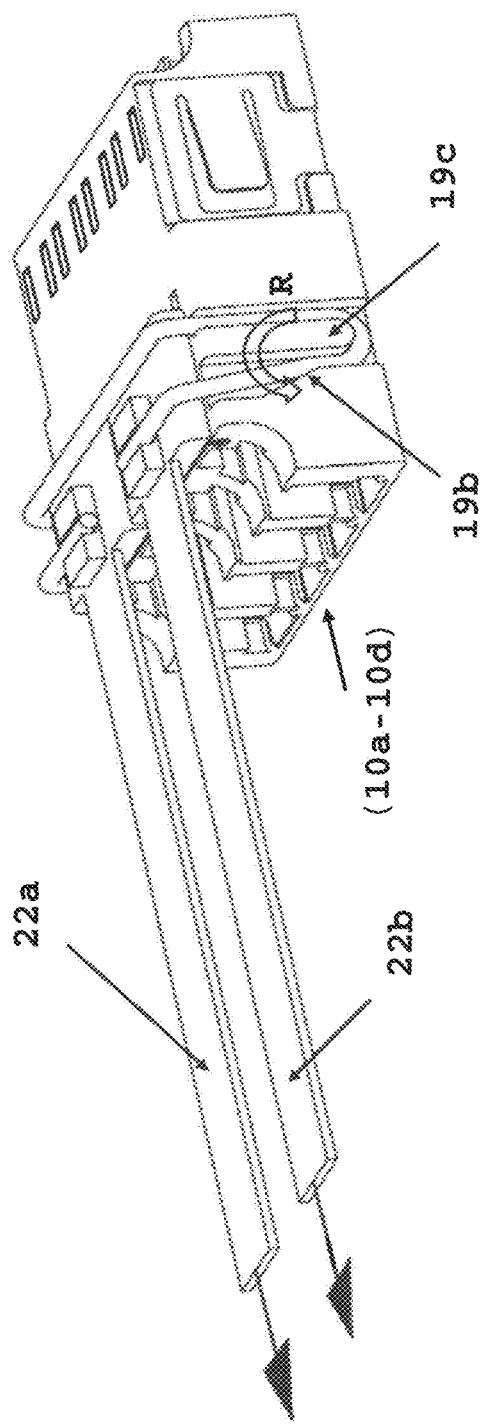
FIG. 14C depicts pulling back both release tab of a duplex adapter deploying the present invention.

FIG. 14A depicts return spring (24) installed with adapter housing (9) and arm (24a, 24b) is bent about retention surface (19c) to provide a bias force to maintain release tab (22a, 22b) in a proximal position, so the ribs do not interfere with the latching of the connector as described in FIG. 11A and FIG. 11B. FIG. 14B is depicts pulling release tab (22a) in a distal direction in the direction of the arrow, and this rotates forward ("R") return spring (24) arm (24b) which engages rib (23b.4) to release a fiber optic connector as described in FIG. 11C, FIG. 11D.1, and FIG. 11D.2. FIG. 14C depicts pulling in a distal direction both release arm (22a, 22b) that rotates both return spring (24) arm (24a, 24b) in the direction of arrow ("R"). This would release a fiber optic connector secured within adapter port (10a-10d).

Figures 15, 16:
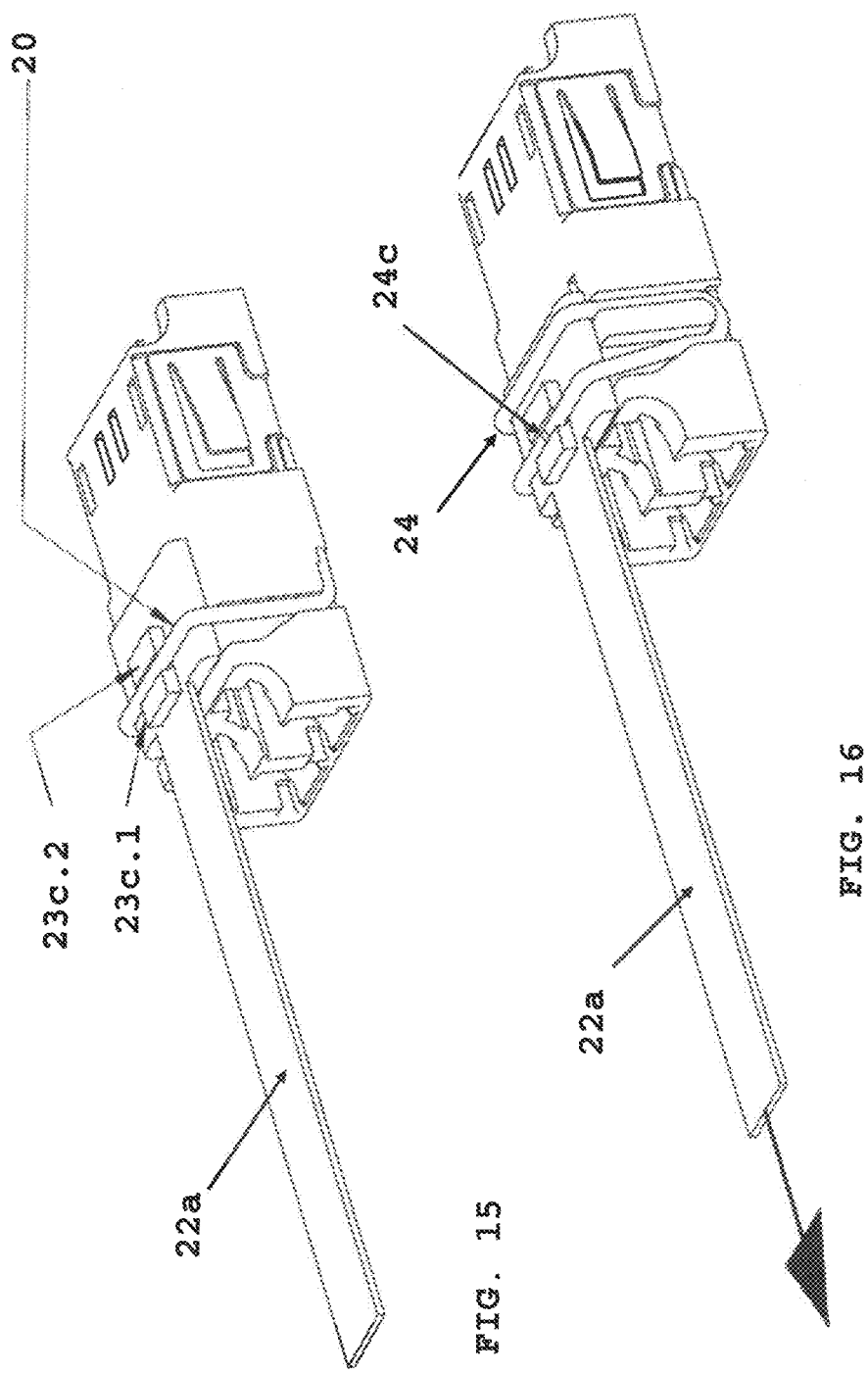
FIG. 15 depicts a second embodiment with a two protrusions retaining release spring.
FIG. 16 depicts a second embodiment of the release spring shown in FIG. 18 deployed on the adapter assembly.
Figure 17:
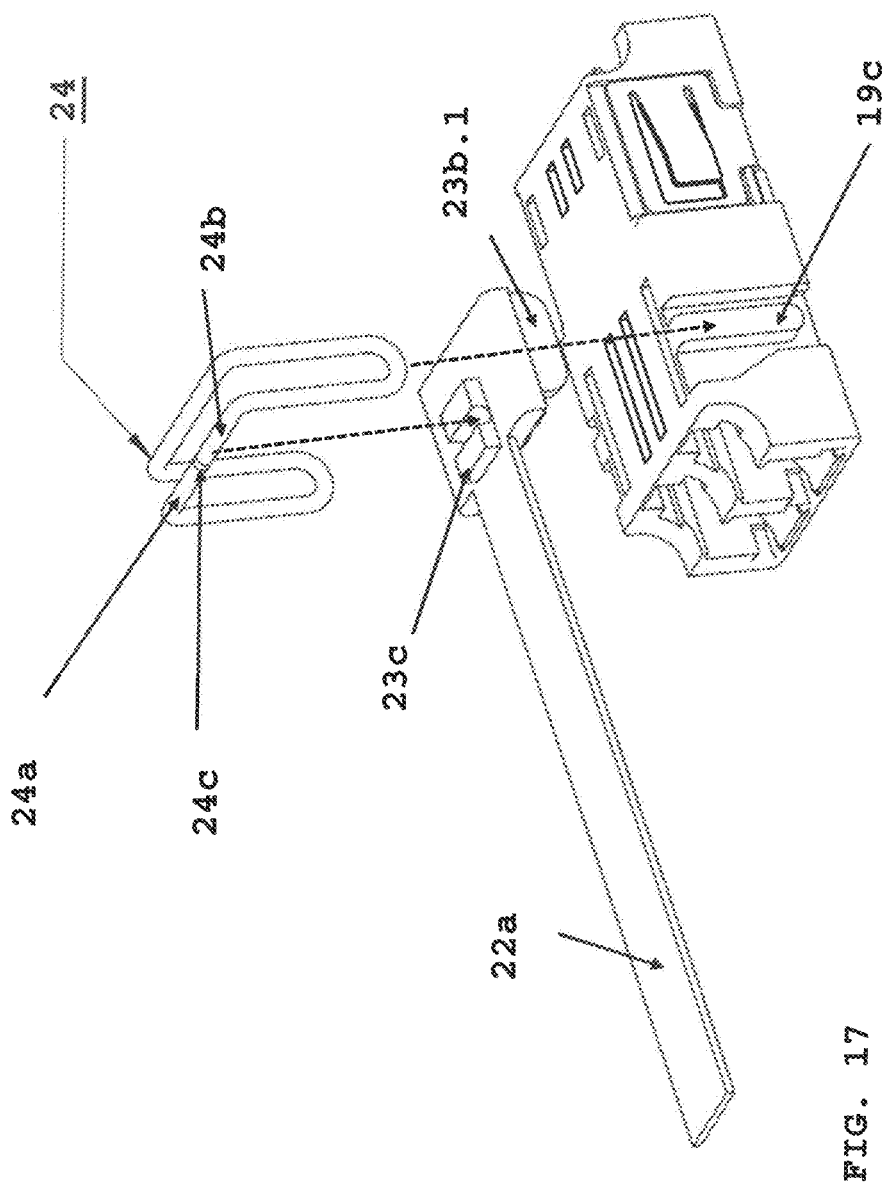
FIG. 17 depicts an exploded view of FIG. 16.

FIG. 15 depicts deploying return spring (20) with bifurcated protrusion (23c.1, 23c.2) on body (23a). FIG. 16 depicts deploying return spring (24) in place of return spring (20) with an adapter with a single port. FIG. 17 depicts deploying return spring (24) instead of return spring (20) to secure release tab (22a) and body (23a) with rib (23b.1-23.b4) with adapter outer housing, as shown in FIG. 16.

Figure 18:
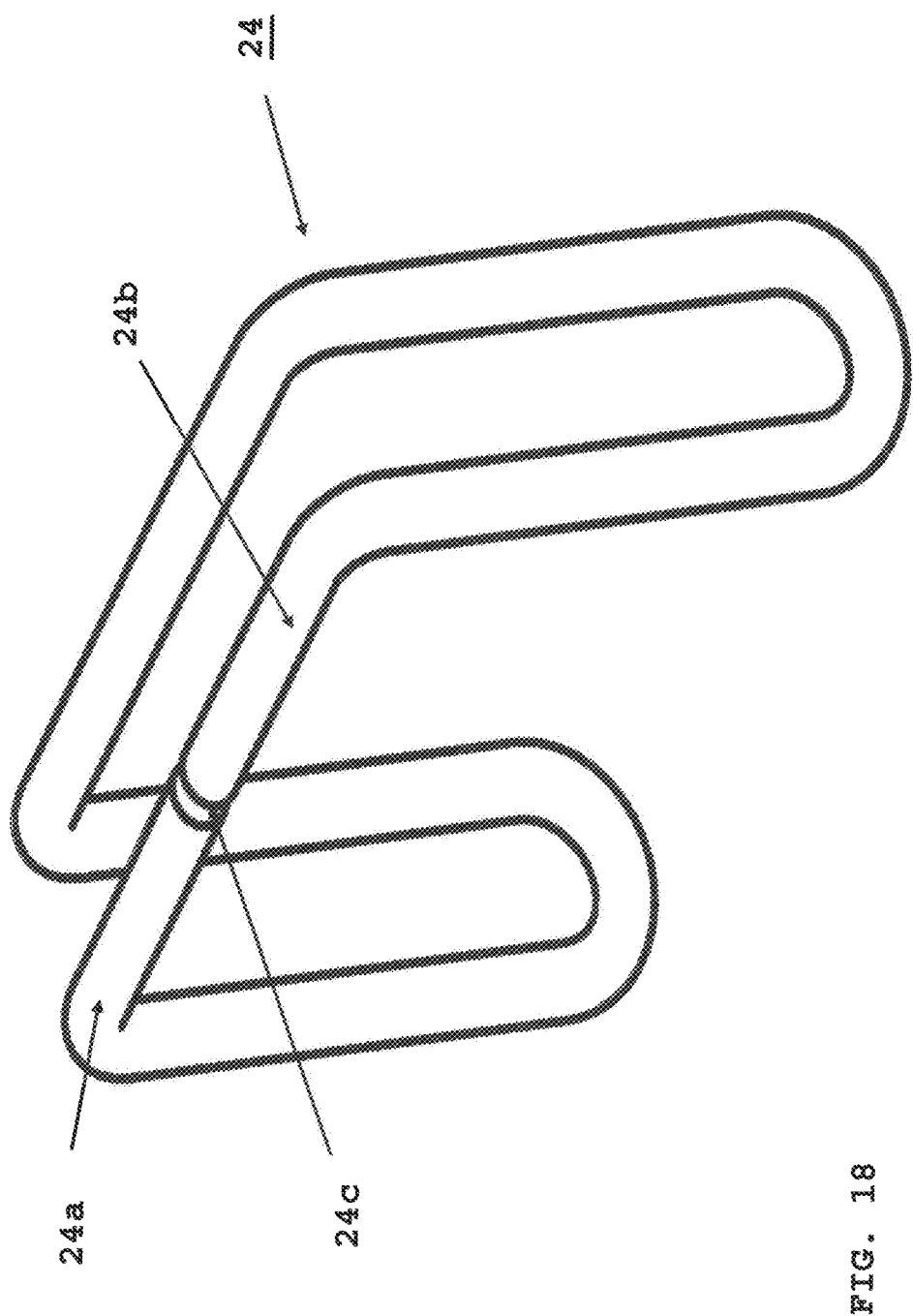
FIG. 18 depicts a perspective view of the release spring according to a second embodiment.

FIG. 18 depicts return spring (24) with first arm (24a) and second arm (24b), as describe above can bias corresponding shaft or release tab (22a, 22b) to ensure the corresponding ribs of the release assembly are forward of the latch of a fiber connector secured within an adapter port. Independent arm (24a, 24b) operation is possible with gap (24c) formed between arm (24a, 24b), as described above.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An adapter assembly configured to release one or more fiber optic connectors secured within an adapter, comprising:
    an adapter housing with one or more adapter ports at a first end and one or more adapter ports a second end;
    a longitudinal bore from between the ports at the first end and the second end;
    a recess formed as part of an outer housing of the adapter; the recess is configured to accept and secure a cross-bar;
    the cross-bar moves upward when at least one fiber optic connector is inserted into the adapter port, and wherein depressing the cross-bar releases the at least one optic connector from the adapter port;
    wherein the cross-bar further comprises a joining member that connects opposing legs, and further wherein the opposing legs are received in a recess formed as part of a sidewall of the outer housing of the adapter.

2. The adapter assembly according to claim 1, wherein the fiber optic connector further comprises a mechanical transfer ferrule with a plural of optical fibers or a single ferrule with a single optical fiber therein.

3. The adapter assembly according to claim 1, wherein a pair of opposing protrusions extending from the cross-bar limit travel of the cross-bar perpendicular to a longitudinal axis of the fiber optic connector inserted into the adapter port.

4. An adapter assembly configured to release a plurality of fiber optic connectors secured within an adapter, comprising:
    an adapter housing having a first end portion and a second end portion spaced apart along a longitudinal axis, the adapter housing defining a plurality of adapter ports opening through the first end portion of the adapter housing, the adapter ports being spaced apart along a lateral axis perpendicular to the longitudinal axis, the adapter housing having an upper wall above the plurality of adapter ports and opposite first and second side walls on opposite lateral sides of the plurality of adapter ports, wherein the upper wall defines an upper recess extending along the lateral axis and overlapping each of the plurality of adapter ports; and
    a cross-bar at least partially received in the upper recess, wherein the cross-bar is configured to be moved upward by one of the fiber optic connectors being inserted into any of the adapter portions, and wherein the cross-bar is configured to be depressed to simultaneously release the plurality of fiber optic connectors from the plurality of adapter ports.

5. The adapter assembly according to claim 4, wherein the cross-bar comprises a joining member extending along the lateral axis from a first end portion to a second end portion, a first leg extending transversely from the first end portion of the joining member, and a second leg extending transversely from the second end portion of the joining member.

6. The adapter assembly as set forth in claim 5, wherein each first and second side walls comprises a side recess adjacent to the upper recess.

7. The adapter assembly as set forth in claim 6, wherein the first leg is received in the side recess of the first side wall and the second leg is received in the side recess of the second side wall.

8. The adapter assembly as set forth in claim 7, wherein each of the first and second legs is configured to engage the adapter housing when the cross-bar is moved upward by one of the fiber optic connectors being inserted into any of the adapter ports to limit upward movement of the cross bar.

9. The adapter assembly as set forth in claim 7, wherein each of the first and second legs defines a surface configured to engage a tool pushed longitudinally toward the adapter assembly such that the cross-bar is depressed by the tool.

10. The adapter assembly as set forth in claim 9, wherein said surface of each of the first and second legs is skewed with respect to the longitudinal axis.

* * * * *